3,281,253
OPTICAL GLASS
Robert A. Weidel, Webster, N.Y., assignor to Bausch & Lomb Incorporated, Rochester, N.Y., a corporation of New York
No Drawing. Filed Mar. 28, 1963, Ser. No. 268,547
4 Claims. (Cl. 106—47)

This invention relates to a novel glass composition and more particularly to a glass composition having a relatively low index of refraction and a relatively low dispersion which is a relatively high $\nu$ value.

Phosphate glasses have been widely accepted for various commercial applications, see for example the patent of Gerald E. Blair 2,999,819. The Blair patent discloses the use of an aluminum metaphosphate, magnesium metaphosphate, lithium metaphosphate glass having silver metaphosphate incorporated therein for use as a dosimeter. Another example of such glasses is shown in the patent to W. A. Weil 2,486,812 wherein an aluminum phosphate material is used as a glassy binder for an electrical insulating composition. Phosphate glasses have also been used for optical glasses. For example, the patent to Izumitani et al. 2,919,201 discloses an optical glass including approximately 50–64 weight percent aluminum metaphosphate.

Phosphate glasses with anomalous partial dispersions have been disclosed in the patent of G. Weissenberg et al. 2,996,390. Glasses of this type include at least 50% by weight of a metaphosphate of the alkaline earth metal and up to 50% by weight of compounds selected from the group consisting of the alkali and alkaline earth metals. Lead oxide, or lead phosphate and boric acid may also be added to the mix.

Optical glasses are commonly selected in view of their refractive index and $\nu$ value. The index of refraction is usually given for the sodium line and is designated by $n_D$ while the $\nu$ value is defined as $n_D - 1$ divided by $n_F - n_C$ wherein $n_F$ and $n_C$ refer to the refractive indices measured at 4861 A. and 6563 A., respectively. For certain applications however, it is highly desirable to have a glass having a particular index of refraction, and $\nu$ value, and yet one which has unusual partial dispersion ratios. The partial dispersion ratios in the visible portion of the spectrum is usually measured by the quantity $P_{\lambda D} = n_\lambda - n_D$. Ordinarily $\lambda$ is taken as the F line in the spectrum and the partial dispersion is then a measure of the ability of the glass to correct for secondary color.

In most cases glasses having a particular index $n_D$ and $\nu$ value are characterized by a substantially linear relationship between $P_{FD}$ and $\nu$. One notable exception to this rule is the family of so-called "short flint" glasses which are further characterized by a substantially lower P value than the ordinary glasses having similar $\nu$ values.

The $P_{FD}$ value of the glasses according to the present invention have been found to differ from ordinary glasses in having a substantially higher P value than common glasses with similar $\nu$ values. These glasses having substantially higher P values are particularly desirable for use in color corrected lens systems. For example, the optical elements made from the glasses according to the present invention may be combined with elements made from the "short flint" glasses in order to match the P values and thereby correct for secondary color.

The partial indices of the glasses disclosed herein depart from the straight line function to a somewhat greater degree than those glasses disclosed and claimed in my copending application entitled "Ceramic Compositions" filed March 28, 1963, S.N. 268,548, and assigned to the same assignee as the present invention.

Compositions according to the present invention can be manufactured in relatively large melts and do not have a strong tendency for devitrification. Furthermore these glasses may be manufactured into optical elements of the usual sizes and shapes and are particularly desirable for secondary color correction in lens systems.

Briefly, the glass compositions disclosed herein consist essentially of an aluminum metaphosphate, an alkali metaphosphate, an alkaline earth metaphosphate, and lead metaphosphate. The aforementioned ingredients are present within the range of 25–50 weight percent, 10–45 weight percent, 10–25 weight percent and 10–25 weight percent respectively. According to the preferred ranges the aluminum phosphate is present within the range of 25–30 percent while the alkali and alkaline earth metaphosphates are approximately 45% and 12.5–17.5% respectively. The lead metaphosphate is present in approximately 12.5 weight percent in the preferred embodiments of the invention.

The metaphosphates are more desirable than other phosphorous materials such as phosphorous pentoxide since they are more stable, and therefore improve the reproducibility of the glasses, simplify the handling techniques and facilitate melting the compositions.

It should also be understood that various oxides or other conventional glass modifiers may be added to the examples disclosed herein. The quantities of such oxides and modifiers is governed by conventional glass techniques, however, for a first approximation they would not exceed 10 weight percent. These oxides may be added to the batch as the oxides themselves or any desired material which would decompose or react in the melt to produce the specified oxides. For example, the corresponding carbonates or hydrates may be used. Examples of these materials include barium carbonate, zinc oxide, potassium carbonate, sodium carbonate, zirconium dioxide, calcium carbonate, magnesium carbonate, strontium carbonate, lead oxide, borax, lithium oxide, rubidium oxide, cesium oxide, cadmium oxide, aluminum oxide, lanthanum oxide, silica, germanium dioxide, niobium oxide, tantalum oxide, bismuth oxide, tellurium oxide and others.

The following examples set forth several operative embodiments of the invention and are not to be construed as limiting the scope of the invention. The examples are given in weight percent batch basis:

|  | A | B | C | D | F | G | H | I | J | K | L | M | N | O | P | Q | R |
|---|---|---|---|---|---|---|---|---|---|---|---|---|---|---|---|---|---|
| $Al(PO_3)_3$ | 50 | 50 | 50 | 50 | 50 | 50 | 50 | 25 | 25 | 25 | 25 | 40 | 30 | 25 | 25 | 30 | 30 |
| $Ba(PO_3)_2$ | 12.5 |  | 25 | 25 |  | 12.5 |  | 25 | 25 | 25 |  |  |  |  |  |  |  |
| $K(PO_3)$ | 25 | 25 |  |  | 12.5 | 12.5 |  | 25 | 25 |  |  | 35 | 45 | 45 | 35 | 40 | 35 |
| $Pb(PO_3)_2$ | 12.5 | 12.5 | 12.5 | 12.5 | 12.5 | 12.5 | 12.5 | 25 | 25 | 25 | 25 | 12.5 | 12.5 | 12.5 | 12.5 | 12.5 | 12.5 |
| $Mg(PO_3)_2$ |  | 12.5 |  |  | 25 |  | 12.5 |  | 25 |  |  | 12.5 | 12.5 | 17.5 | 27.5 | 17.5 | 22.5 |
| $Li(PO_3)$ |  |  | 12.5 |  |  | 25 | 25 |  |  | 25 | 25 |  |  |  |  |  |  |
| $n_D$ | 1.535 | 1.529 | 1.557 | 1.550 | 1.531 | 1.549 | 1.542 | 1.559 | 1.542 | 1.593 | 1.559 | 1.525 | 1.517 | 1.516 | 1.522 | 1.520 | 1.522 |
| $\nu$ | 64.8 | 64.6 | 63.5 | 63.1 | 65.0 | 64.4 | 64.9 | 58.4 | 59.2 | 59.9 | 59.1 | 64.0 | 64.3 | 64.5 | 64.1 | 63.5 | 64.3 |

Examples N and O represent the presently preferred embodiments of the invention. For illustration the partial indices of example N measured at various wavelengths are as follows:

| λ in A. | $n_\lambda$ |
|---|---|
| C ------ 6,563 | 1.51422 |
| D ------ 5,893 | 1.51658 |
| 5,780 | 1.51709 |
| E ------ 5,461 | 1.51861 |
| 4,916 | 1.52189 |
| F ------ 4,861 | 1.52230 |
| G ------ 4,358 | 1.52672 |
| H ------ 4,047 | 1.53033 |

The same sample has been found to have the following partial dispersions $P_{(CD)}=.292$; $P_{(FG)}=.547$ and $P_{FG'}=.570$.

The conditions and controls for carrying out the melting, annealing, and cooling steps are subject to wide variation. For example, in some cases a batch of raw ingredients may be melted in a refractory pot, or a platinum lined vessel. Similarly, temperatures, times and conditions vary according to the amount of glass being formed, therefor the temperature and melting conditions recited hereinafter are given by way of illustration and are not intended to limit the scope of the appended claims.

For example, the ingredients in the powdered form are mixed together and place in a platinum crucible. The crucible containing the mixture is placed in an electric resistance furnace and the ingredients are melted therein at a temperature of approximately 1200–1300° C. Relatively small melts were made in this manner and were held at this temperature for approximately 3–4 hours. Larger melts could also be made at this same temperature, however, with larger melts it is desirable to stir the glass according to conventional glass making techniques for approximately 4 hours. The melts were cast at approximately 800–1200° C. on a plate having a temperature of approximately 100°–300° C. All types of the glass disclosed herein were annealed at approximately 300°–500° C.

Such matters as contained in the text "Properties of Glass" by G. W. Morey, "Modern Ophthalmic Lenses and Optical Glass" by Theo. E. Obrig (1935) and "The Manufacture of Optical Glass and of Optical Systems," Ordnance Department, Document 2037, Government Printing Office, 1924, set forth additional details about glass manufacturing. Such details are considered to comprise the background information about the manufacture of optical glasses and are considered to be conventional.

What is claimed is:

1. A glass composition consisting essentially of 25–50 weight percent aluminum metaphosphate, 10–45 weight percent alkali metaphosphate, 10–25 weight percent alkaline earth metaphosphate and 10–25 weight percent lead metaphosphate.

2. A glass composition consisting essentially of 25–30 weight percent aluminum metaphosphate, approximately 45 weight percent alkali metaphosphate, 12½–17½ weight percent alkaline earth metaphosphate and 10–25 weight percent lead metaphosphate.

3. A glass composition consisting essentially of 30 weight percent aluminum metaphosphate, 45 weight percent potassium metaphosphate, approximately 12½ weight percent magnesium metaphosphate and approximately 12½ weight percent lead metaphosphate.

4. A glass composition consisting essentially of 25 weight percent aluminum metaphosphate, 45 weight percent potassium metaphosphate, 17.5 weight percent magnesium metaphosphate and 12.5 weight percent lead metaphosphate.

References Cited by the Examiner
UNITED STATES PATENTS

| 2,294,844 | 9/1942 | Gelstharp | 106—47 |
| 3,118,788 | 1/1964 | Hensler | 106—47 |

TOBIAS E. LEVOW, *Primary Examiner.*

H. McCARTHY, *Assistant Examiner.*